United States Patent [19]

Kafka et al.

[11] Patent Number: 4,600,637
[45] Date of Patent: Jul. 15, 1986

[54] PROCESS FOR THE CONTINUOUS PRODUCTION OF COMPOSITE FOAM PANELS AND RESULTANT PRODUCT

[75] Inventors: Bernard Kafka, Rantigny; Jean-Paul Meunier; Serge Have, both of Clermont, all of France

[73] Assignee: Isover Saint-Gobain, Courbevoie, France

[21] Appl. No.: 603,172

[22] Filed: Apr. 23, 1984

[30] Foreign Application Priority Data

Apr. 22, 1983 [FR] France .................. 83 06624

[51] Int. Cl.[4] .............. B29C 39/16; B29C 39/18; B29C 39/20
[52] U.S. Cl. .................. 428/318.4; 264/45.3; 264/46.2; 264/145; 264/257; 264/DIG. 2; 425/115; 425/817 C
[58] Field of Search .............. 264/DIG. 2, 46.4, 46.2, 264/45.5, 145, 45.3, 257; 428/318.4, 307.3

[56] References Cited

U.S. PATENT DOCUMENTS 3,821,337  6/1974  Bunclark et al. .............. 264/46.2 X
4,252,515  2/1981  Meunier et al. .............. 264/45.5 X
4,332,754  6/1982  Meunier et al. .............. 264/46.2 X

FOREIGN PATENT DOCUMENTS

1489737  10/1977  United Kingdom .

Primary Examiner—Philip Anderson
Attorney, Agent, or Firm—Oblon, Fisher, Spivak, McClelland & Maier

[57] ABSTRACT

A liquid mixture containing a heat-expandable resin and a catalyst is cast onto a lower facing, which is heated from below to cause expansion of the mixture and hardening of its lower part. The upper surface of the expanding mixture is covered with an upper facing applied while that portion is still soft, and the composite formed thereby is introduced to a heated enclosure while the upper part remains soft. The thickness of the formed composite, and panels derived thereof, is calibrated or limited by opposed conveyors within said thermal enclosure, which limits the maximum expansion to a value less than the theoretical potential expansion of the foam, allowing hardening to be completed, and subsequent cutting of the composite into panels.

11 Claims, 11 Drawing Figures

FIG_7a

FIG_7b

PROCESS FOR THE CONTINUOUS PRODUCTION OF COMPOSITE FOAM PANELS AND RESULTANT PRODUCT

BACKGROUND OF THE INVENTION

1. Field of the Invention

The invention relates to the continuous production of composite panels comprising a foam core made of an expanded resin and facings particularly resulting in a strong, homogeneous panel.

2. Background of the Prior Art

Composite panels of the type addressed herein are conventionally obtained, for example, by casting of a mixture containing a heat-expandable resin on a lower facing passing continuously, then by superposition of an upper facing on the cast layer while it is expanding, followed by a calibration after expansion of the composite, and cutting of the panels into the desired lengths after complete hardening of this composite.

This process is not entirely satisfactory. Because of an imperfect distribution of the resin during casting of the mixture, a casting that is generally performed by a casting head driven in a back and forth movement croswise to the direction of advance of the lower facing acting as a support, or again by a stationary head placed perpendicular to the direction of displacement, varying thicknesses occurs in the formed layer. These irregularities are amplified by expansion of the resin and can be eliminated or at least attenuated only by a calibration considerably reducing the thickness of the composite. Since it is not possible to maintain the integrity of the panel in the lateral direction in the calibration zone for reasons indicated below, this calibration, even in the case of slight reductions of the thickness, for example, on the order of a few millimeters, particularly causes lateral creep of the upper part of the cast layer which, in the case of a production process using heating from below, is softer than the lower part. This creep then causes a rupture line or surface and thereby a weakening of the mechanical properties of the panels produced. When the composite is held laterally in the calibration zone, the excess material flows back upstream, accumulates in front of the calibration passages and disturbs production.

This invention eliminates the noted drawbacks. The process according to the invention makes it possible to obtain panels exhibiting a good geometric definition and good mechanical properties.

SUMMARY OF THE INVENTION

According to the invention, a continuous composite is produced comprising a foam core and at least a facing on each of its faces, by open-air casting, on at least a lower facing, a liquid mixture containing a heat-expandable resin to form a sheet, heating the latter from below, which is carried by the lower facing, to cause its expansion and hardening of the lower portion of the cast resin mixture, covering the upper face of the composite during expansion with at least an upper facing, and calibrating the composite while the upper inner part of the composite is still soft and the lower inner part of the sheet is hard, while avoiding a lateral creep of said soft upper inner part.

According to an aspect of the process, lateral creep of the soft upper inner part of the expanded sheet is avoided by limiting the compression of the composite during calibration. For this purpose, the composite being formed is presented at the passage for calibration when its thickness is slightly, about a few millimeters, less than the calibration distance which itself is slightly less, by a value of about 1 to 5 millimeters, preferably 1 to 3 mm, than the maximum potential thickness of the composite, i.e., the thickness corresponding to the maximum free potential expansion of the sheet, and the composite is kept at the calibration distance until it completely hardens. Thus, by acting at the surface of the composite over a thickness generally between 1 to 5 millimeters, regardless of the total thickness of the composite produced, a regular surface is obtained while avoiding any formation of a rupture line.

In a variant, lateral creep during calibration is avoided by keeping the upper party of the layer soft by impregnation of this part with at least an upper facing which must exhibit sufficient mechanical properties and particularly a good dimensional stability and which, advantageously is permeable to the case liquid mixture to allow a better impregnation.

In this variant, the total thickness of the composite undergoing formation arriving at the passage for calibration can be greater than the calibration distance, by a value which still should be less than the thickness of the upper unimpregnated facing. Calibration then has the particular effect of introducing the upper facing in the soft inner layer which is thus reinforced and cannot creep laterally.

By heating only from below, according to the invention, before calibration, solififying of the upper layer of the sheet is avoided and thereby a poor impregnation of the upper facing is avoided.

Heating from below makes possible a still better heat transfer which allows production of a resin foam with a very slight density.

The sheet constituting the generally rigid foam core can be made from any resin that can form a foal by the action of heat produced by the curing reaction of the resin itself and more preferably, from applied heat. Advantageously, the invention is applied to continuous production of panels whose core is a phenol foam, i.e., a foam formed from an A-stage resin in the presence of a surface-active agent, an expansion agent and a hardening catalyst.

The A-stage resins used are preferably, for example, those described in the publication of French Pat. No. 2,309,574. The molar ratio of formaldehyde to phenol is between about 1 and 1.7, preferably close to 1.4. These resins have a dry extract of about 70% by weight, a residual free phenol content of about 7.5% by weight and a viscosity on the order of 1800 to 2000 centipoises at a temperature of 20° C.

The expansion agent for these resins is generally a mixture of pentanes or petroleum ethers or freons. The surface-active agent which makes it possible to obtain a good dispersion of the expansion agent is, for example, a silicone oil or a sorbitan ester.

The facings used within the context of the invention can be sheets that are impermeable or, on the contrary, permeable to the cast mixture. As impermeable sheets there can be used thin metal sheets such as aluminum sheets, sheets of paper or cardboard with a weight generally above 50 g, plastic sheets compatible with the cast mixture or bituminous facings which make it possible to obtain fluid-tight composite products used, for example, for sealing roofs. For sheets that are permeable to the cast resin, it is possible to use woven or unwoven mats made from mineral fibers such as glass fibers or organic fibers.

The upper facings used in the variant described above, in which the upper facing performs the function of holding the soft upper part of the sheet during calibration, should, as indicated above, be thick and resistant to constitute a reinforcement preventing lateral creep of the resin layer at the moment of calibration of the composite. Advantageously, they are permeable to the cast mixture. For example, a mat of continuous glass fibers or yarns, particularly a UNIFILO mat, is used, i.e., a mat consisting of continuous yarns, with plastic lubricant, without twist, uncut, having a surface density greater than 250 g/m². Alternatively, it is possible to use corrugated.

According to an advantageous characteristic of the invention, the lower facing which receives the casting of the liquid mixture is heated to a temperature that assures a solidification of the latter as soon as it comes in contact with the layer. Thus, the mixture is kept from flowing and disturbing production, particularly when the lower facing is permeable.

According to another characteristic of the invention, contact, without slipping, is made between the upper facing and the cast mixture, by making both advance at equal speeds in the zone of their mutual approach. This prevents disruption of the development of the upper surface skin of the foam sheet. The contact thus being established, it is advantageous to assure application of the facing to the mixture forming the sheet.

The invention also relates to a device for using the process. This device comprises a lower conveyor belt, an upper conveyor belt parallel to the lower belt, shorter than the lower belt and placed above its downstream portion. These two belts together form a passage for calibration of the composite in thickness, at least a casting head placed above the upstream part of the lower conveyor belt, heating means placed below the lower conveyor belt, means for supplying the lower facing placed upstram from the casting head, means for supplying the upper facing placed between the casting head and the upper belt, a tunnel furnace surrounding the passage for calibration and whose entry advantageously corresponds to the entry of the passage for calibration in which furnace hardening of the composite product is completed.

The device can also comprise in its upstream part, before the passage for calibration, two side strips which, with the conveyor belt, form an expansion channel for the foam.

The device can further comprise an element assuring the applicatin of the upper facing to the sheet.

Other advantages and characteristics of the invention will become apparent from the description below with reference to the figures.

DETAILED DESCRIPTION OF THE INVENTION

Figure 1:
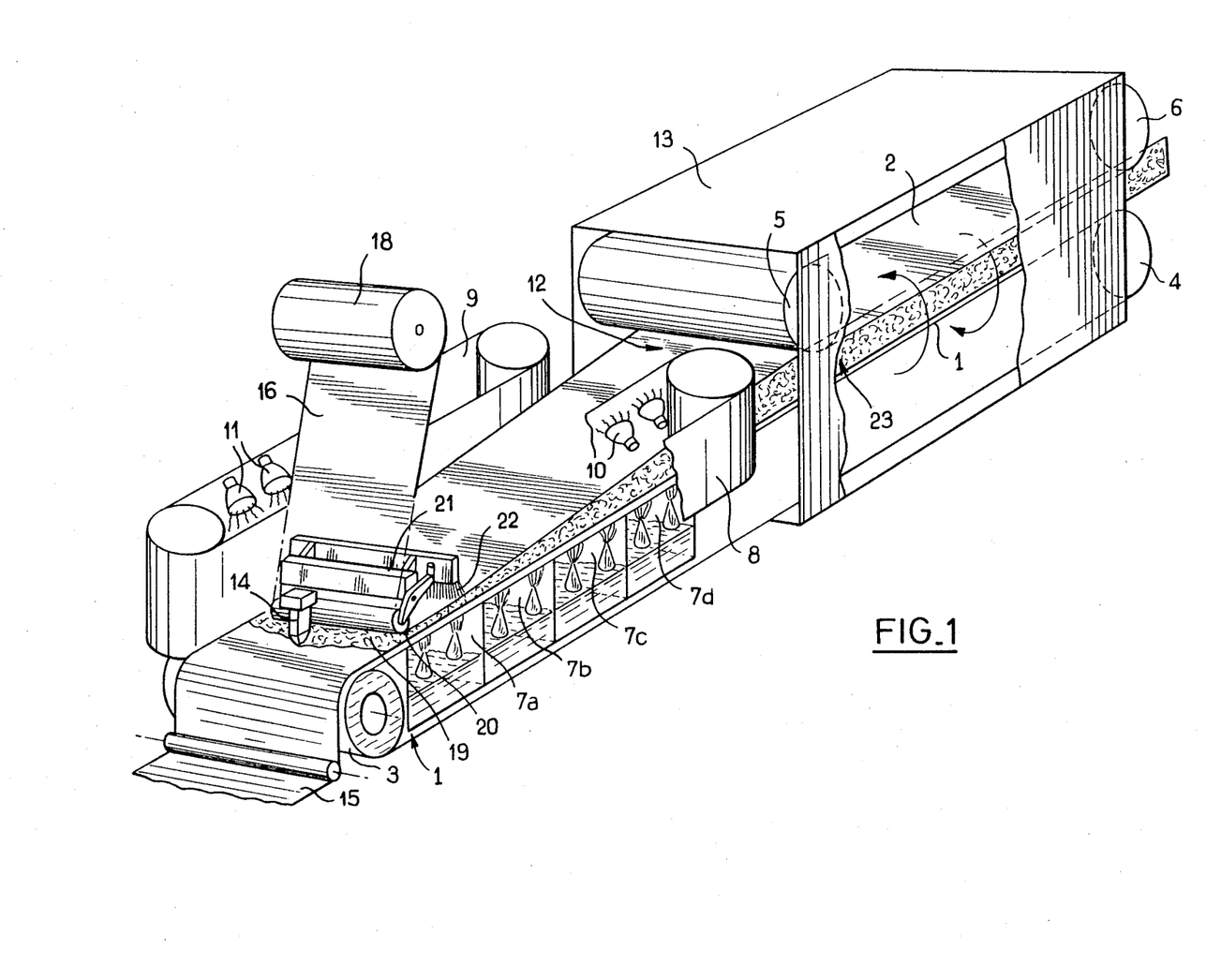
FIG. 1 is a general view of the device for continous production of a composite comprising an expanded resin core and coated faces.

The panels according to the invention are produced continuously on a production line such as that represented diagrammatically in FIG. 1. The production device comprises an endless conveyor belt 1 and an endless upper conveyor belt 2, each consisting for example of a stainless steel strip of a thickness close to 1 millimeter, covered with a glass fabric coated with teflon on the side of the belt facing the mass undergoing expansion. Lower conveyor belt 1 has a carrying run about twice as long as the corresponding carrying run of the upper belt 2. In the embodiments given below the carrying run of lower belt 1 has a length close to 10 meters. Use of very thin metal strips 1 and 2 greatly promotes the heat exchange efficiency of the device and consequently gives a good flexibility to production.

Guide rolls 3, 4 and 5, 6, respectively guide conveyor belts 1 and 2; rolls 3 and 5 comprise a device known in the art in which hot water at an adjustable temperature circulates within the roll and indirectly heats the conveyor belts. Additional heat is brought to lower belt 1, in the part not covered by upper belt 2, by a spray of hot water at adjustable temperature, performed in a certain number of compartments 7a, 7b, 7c, 7d, located under the upper carrying run of conveyor belt 1.

The temperature of conveyor belt 1 is generally increased from one compartment to the next, in the direction of displacement of the belt, to increase the temperature of the sheet and to control its expansion. Spraying of hot water in the compartments has proven to offer a great flexibility of use to regulate the expansion of the sheet as a function of its rate of hardening.

Endless side strips 8 and 9 which generally have the same makeup as endless belt 1 form, with belt 1, an expansion channel for the foam. Opposite these strips are provided means 10 and 11, such as infrared lamps, to heat the side strips. This arrangement has the effect of assuring a uniform expansion of the sheet in the crosswise direction.

In the part of the device where they work together to constitute the passage for calibration 12 of the composite, the two endless belts 1 and 2 go into a tunnel furnace 13 with hot gas, particularly hot air, circulation, the entry of the tunnel furnace corresponding to the entry of the passage for calibration.

Figure 2:
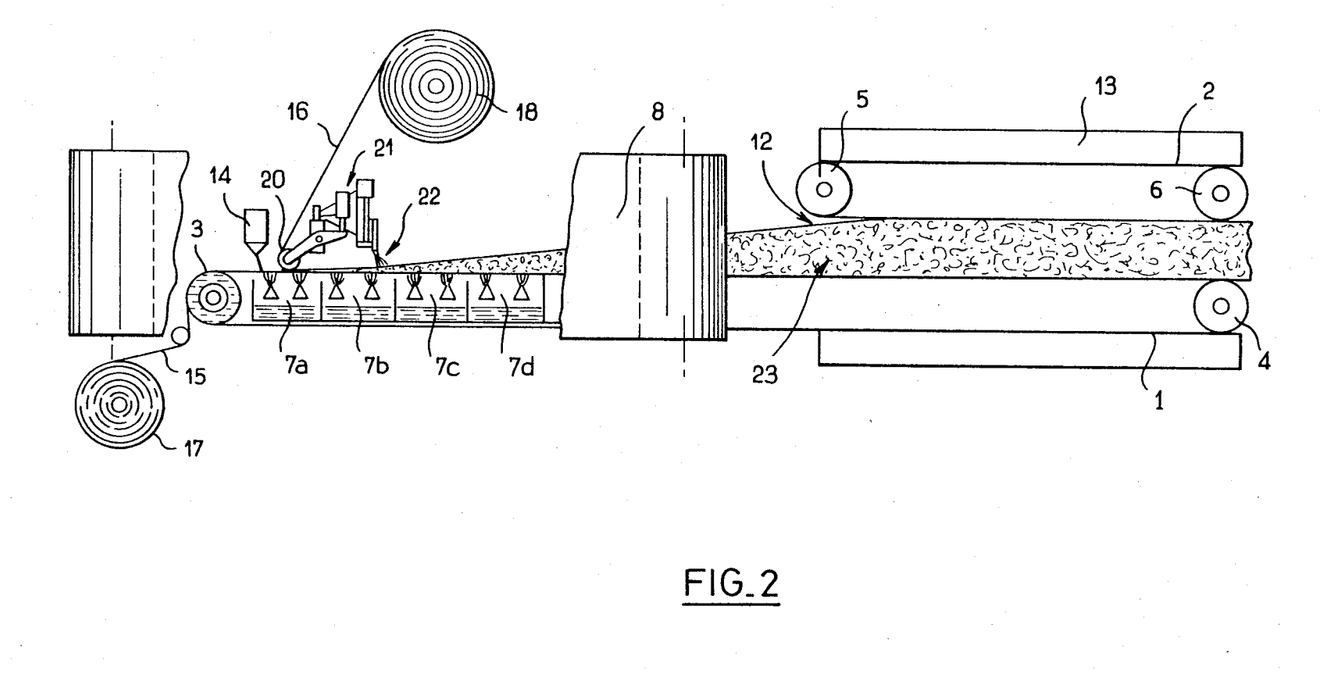
FIG. 2 is a view in section of the device of FIG. 1 in use in which the composite reaches the calibration passage when it has not reached the thickness corresponding to the maximum potential free expansion of the sheet.

The production line is essentially supplied, on the one hand, with a liquid expandable mixture delivered to casting head 14 by standard elements, not shown, and with lower facing 15 and upper facing 16 coming from rolls 17 and 18 as shown in FIG. 2.

The liquid mixture deposited on facing 15 by casting comprises in a preferred embodiment a liquid A-stage resin, an expansion agent that is also liquid, and an acid catalyst.

Upper facing 16 is applied to this cast layer or sheet 19 by an applicator roll 20, carried by an element 21 which in its downstream part comprises a brush 22 assuring application of the upper facing by making it penetrate superficially into the cast sheet of resin mixture.

Guide roll 3 can be heated to solidify the lower part of the cast layer as soon as it has impregnated the sheet.

Figure 3A:
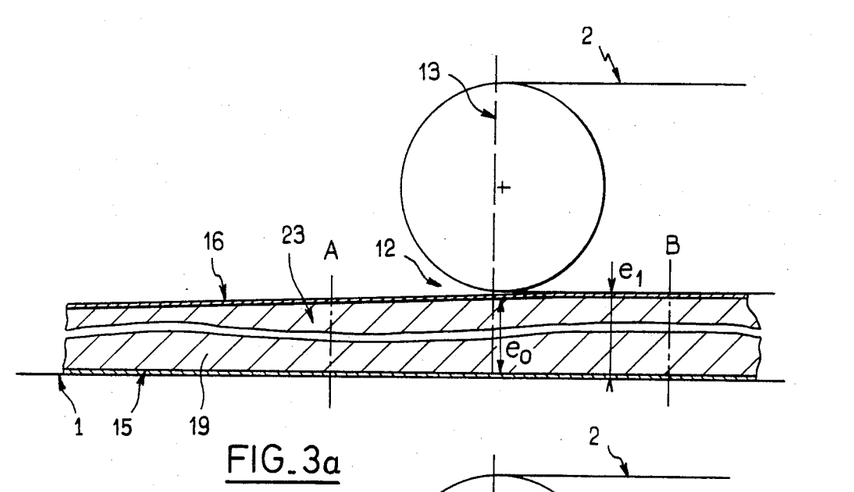
FIG. 3 is a detailed view of FIG. 2.

FIGS. 2 and 3, which are detail views, represent the preceding device in a use in which composite 23 reaches the passage for calibration 12 when it exhibits a thickness $e_0$ less than calibration distance $e_1$. Expansion of sheet 23 continues in the passage for calibration until it is heated by the lower carrying run of upper belt 2.

Figure 3B:
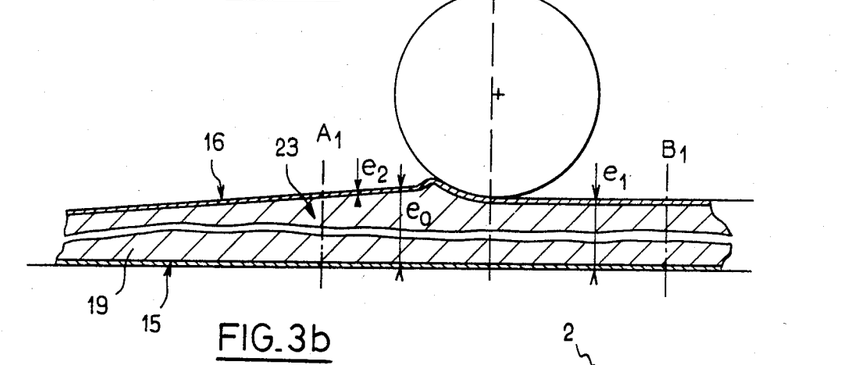
FIG.3B illustrates the same detailed view when the composite exhibits, upstream from the calibration, a thickness greater than the calibration distance.

FIG. 3B represents the same part of the device as FIG. 3 but when composite 23 reaches the passage for calibration 12 with a total thickness $e_0$ greater than the calibration distance $e_1$, by a value greater than thickness $e_2$ of the upper facing. At the moment of calibration, the excess material flows laterally and also forms a bead in front of upper facing 2.

Figure 4:
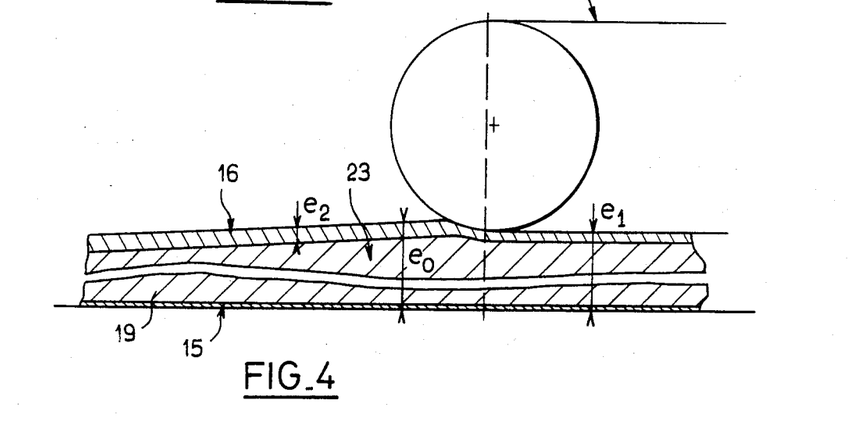
FIG. 4 represents the same detailed view of FIG. 2 in a use of the device using a thick, permeable, resistant upper facing in which the composite undergoing formation has reached, before calibration, a thickness slightly greater than the calibration distance.

FIG. 4 represents the same detail view in a use of the device using a thick, permeable, resistant upper facing 16 and in which composite 23 being formed reaches the passage for calibration with a thickness $e_0$ greater than calibration distance $e_1$, by a value less than thickness $e_2$ of the upper facing. At calibration, upper facing 16 is pressed into the still soft inner layer of sheet 19 in which it acts as a reinforcement, preventing any further lateral creep.

Embodiments of the panels according to the process of the invention are described below. Unless indicated otherwise, the following examples are illustrative only, and are not intended to limit the invention.

EXAMPLE 1

A continuous composite is produced, having a core of phenol foam, a thickness of about 50 millimeters, a width of about 500 millimeters, an apparent density of about 25 kg per m$^3$, on the lower and upper faces of which is applied a glass mat called "Velimat" (registered trademark of the company ISOVER SAINT-GOBAIN), with a surface density of 95 g/m$^2$.

The premixture, which is taken into casting head 14, has the following composition (in parts by weight):

100 parts of A-stage resin in aqueous solution as described in the publication of the patent FR No. 2 309 574

(molar ratio of F/P=1.4)
% free phenol: 7.25
dry extract: 72%
viscosity at 20° C.: 2000 centipoises
1.125 parts of DC 193 silicone oil (marketed by DOW CORNING company)
6.75 parts of technical pentane at 25% isopentane The premixture, introduced at a rate of 1.8 kg per minute, and the catalyst (aqueous hydrochloric acid solution at 32% by weight), introduced at a rate of 0.2 kg per minute, are mixed in casting head 14.

The casting head pours out, in the upstream part of the production line, the mixture dispersed on glass mat 15 carried by endless belt 1 at a speed of about 1.63 meters per minute, which corresponds to a duration of 6 minutes of this product on the line whose useful length is about 10 meters.

Adjustment of the temperature of the heating fluids at the various points of the line are effected according to the following devices and schedule:

drum 3 (hot water): 55° C.
compartment 7a (hot water): 55° C.
compartment 7b (hot water): 60° C.
compartment 7c (hot water): 60° C.
compartment 7d (hot water): 70° C.
drum 5 (hot water): 70° C.
tunnel furnace 13 (hot air): 125° C.

Under the effect of the temperature elevation which they undergo in the open-air expansion zone, i.e., during travel of the endless belt 1 above compartments 7a, b, c and d, the pentane droplets, dispersed in the mixture, vaporize and cause swelling of sheet 19. When the mixture reaches the height of applicator roll 20, located about 30 centimeters downstream from casting head 14, a second mat 16 is applied to the surface of the sheet undergoing expansion, the contact pressure between mat 16 and the upper face of the sheet being adjusted by regulating the distance separating applciator roll 20 from conveyor belt 1. Good adjustment is attained when no flowback of the material of the mixture at right angles with roll 20 occurs, in the contact zone, between mat 16 and the sheet undergoing expansion. Care should be taken to make a contact, without slipping, of mat 16 on the sheet surface by equalizing the speeds of advance of mat 16 and the sheets of mixture by adjusting the retainers known in the art with which the shafts carrying mat rolls 17 and 18 are equipped.

The contact, with the soft, tacky surface of the sheet undergoing expansion, is equalized by brush 22 located about 40 centimeters downstream from applicator roll 20 and whose pressure on mat 16 is so regulated to sink the latter partially into the sheet. The pressure applied by brush 22 on top of mat 16 is adjusted by regulating the position of the brush in height in relation to conveyor belt 1. A good adjustment is attained when the mixture partially impregnates mat 16 without, however, soiling the bristles of the brush or escaping from between the mats to their selvedges.

Advance of mat 16 toward the passage for calibration 12 continues by means of the sheet of mixture, which is carried by mat 15. During this advance, the distance of mat 16 from belt 1 increases because of the development of foam within the mixture. At this stage of expansion, hardening of the foam begins to occur in the core of the sheet under the actin of the acid incorporated in the premixture in the casting head, while the upper surface of the foam remains pliable because mat 16 which covers it delays the surface hardening and also because of the heating which acts only from below. The side edge of the sheet, to which direct access is available upstream from the passage for calibration 12 makes it possible to follow the development of the hardening of the foam by its conditions and touch.

The amounts of pentane and hydrochloric acid used have been determined by preliminary tests so that the composite under formation, on arrival at the passage for calibration of the available machine, exhibits a thickness about 2 mm less than the calibration distance. The upper face of the sheet is contained by glass mat 16; whose lengthwise profile rises very slightly, then comes completely in contact with the lower carrying run of belt 2 at the end of a travel of the sheet in funnel furnace 13 of about 30 centimeters, while an expansion capacity in thickness of 2 to 3 mm remains. Under these conditions, contact between the foam layer and upper belt 2 occurs without appearance of wrinkles or beads and maintenance of the sheet at constant thickness is promoted by the ability of the foam to deform superficially at the point of contact.

At the output of the tunnel furnace, the totally hardened composite is cut into panels which are subjected to an additional drying at 115°/120° C. for a period of 6 hours to eliminate residual hydrochloric acid and water.

The resulting panels exhibit a good surface condition and are free of rupture lines.

Figure 5:
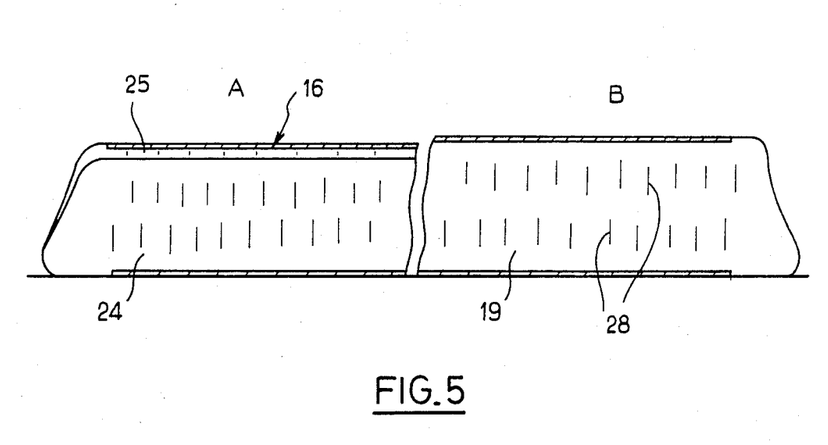
FIG. 5 represents two crosswise half-sections of the composite, before and in the passage for calibration along lines A and B of FIG. 3.

FIG. 5 shows two half-sections along lines A and B of FIG. 3 of the composite obtained according to this Example 1. Half-section A shows that the foam sheet 19 is formed of an already hardened lower layer 24 surmounted by a still soft upper layer 25 containing the upper facing 16. Half-section b shows a completely hardened, homogenous foam layer 19, free of rupture lines. Lines 28 diagrammatically represent the main orientation of the cells. This orientation is vertical.

EXAMPLE 1B

This example is a comparative example describing the production of a composite of the type described in Example 1, but by use of a process not according to the invention.

The operation is the same with the same products as in Example 1 except the calibration height is lowered, by placing the lower carrying run of upper belt 2 at a distance of 45 mm from lower belt 1. Under these conditions, the composite undergoing expansion reaches the passage for calibration with a thickness about 3 millimeters greater than the calibration distance. At the passage for calibration, the composite undergoes a reduction in thickness by compression between the carrying runs of the lower and upper belts, and a bead of material 30 is formed in front of upper belt 2. After drying, the continuous deposit is cut into panels.

Figure 6:
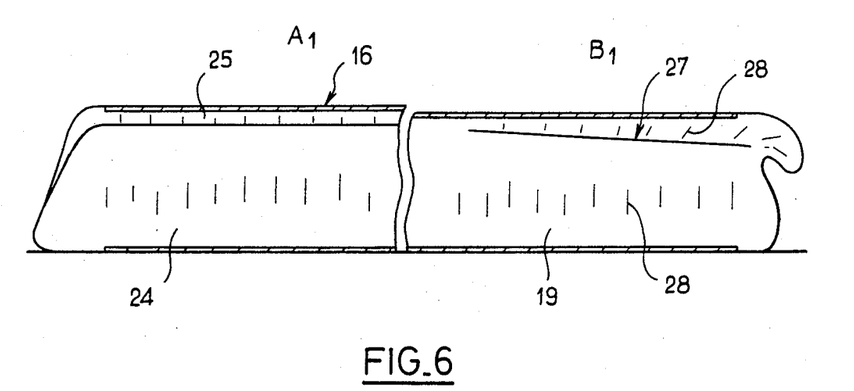
FIG. 6 represents two crosswise half-sections of the composite when calibration has the effect of reducing its thickness before and in the passage for calibration according to lines $A_1$ and $B_1$ of FIG. 3B, FIGS. 7 and 7B, 8 and 8B represent percentage curves of stress deformation according to standard NFT 56101 for composite panels according to the invention and comparative panels.

In FIG. 6 which represents two half-sections along lines $A_1$ and $B_1$ of FIG. 3B of the composite obtained according to this Example 1B, half-section $A_1$ shows again that the foam sheet 19 is formed of an already hard layer 24 surmounted by a still soft upper layer 25 containing the upper facing 16. After calibration, half-section $B_1$ first shows that the total height of the composite has been reduced by compression and that this compression has caused a lateral creep shown by the sloping lines 28 representing the main orientation of the cells of the upper inner layer, causing a rupture line 27 between this upper layer and lower layer.

Figure 7A:
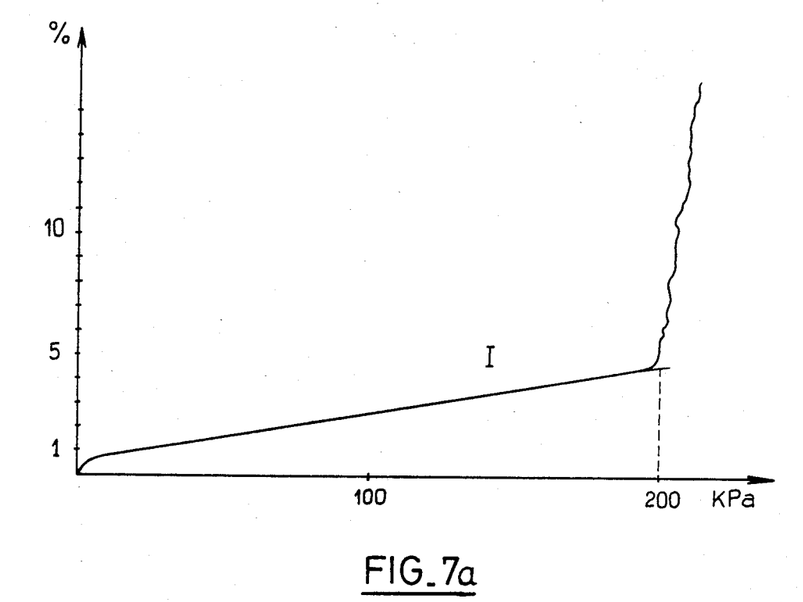
Figure 7B:
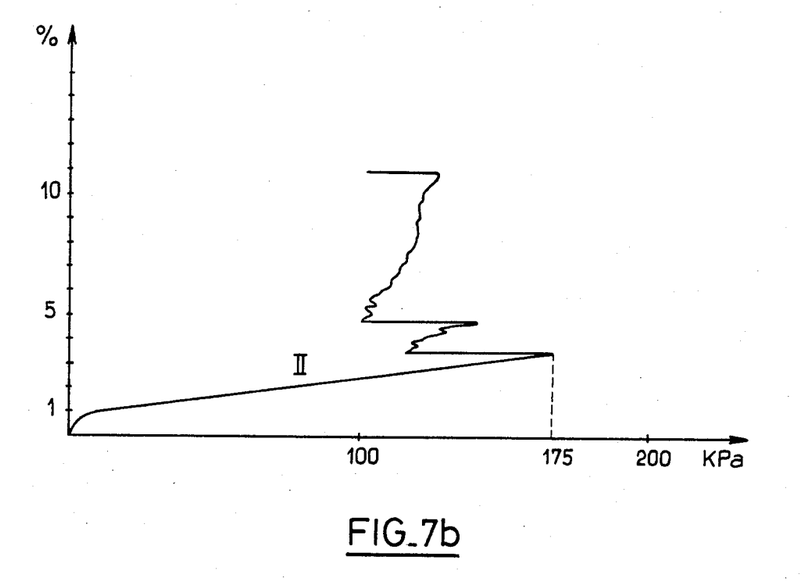

FIGS. 7 and 7B show the curves of percentage of stress deformation of the panels obtained according to Example 1 (curve 1) and Example 1B (curve II) according to standard NFT 56101, and show their resistance to compression. The panels obtained according to Example 1, free of rupture line, exhibit a resistance to compression of about 200 KPa, while the panels obtained according to Example 1B exhibit a resistance to compression of about 175 KPa despite a greater density for these panels. The breaks in curve II also indicate that the product is heterogeneous.

EXAMPLES 2 TO 8

The process described in Example 1 is repeated and applied to producing panels of varied densities and thicknesses. The corresponding production controls are given in Table 1 below.

The resulting panels always exhibit a very satisfactory surface condition and good mechanical properties.

TABLE 1

| | | | Examples n° | | | | | | |
|---|---|---|---|---|---|---|---|---|---|
| | | | 2 | 3 | 4 | 5 | 6 | 7 | 8 |
| Apparent density (kg/m³) | | | 18 | 20 | 10 | 25 | 25 | 25 | 25 |
| Thickness | | | 50 | 40 | 50 | 30 | 25 | 20 | 80 |
| Premixture | A-stage resin in aqueous solution | | 100 | 100 | 100 | 100 | 100 | 100 | 100 |
| (parts by | DC 193 silicone oil | | 2 | 1.75 | 1.3 | 1.1 | 1.2 | 1.4 | 1 |
| weight) | Technical pentane | | 12 | 10 | 20 | 6.25 | 7 | 8 | 5.75 |
| Nature of facing | | | | | | "Velimat" 121 | | | |
| Regulation | Drum | expansion zone | 55 | 55 | 55 | 60 | 60 | 60 | 60 |
| of | Compartment 7a | | 55 | 55 | 55 | 60 | 60 | 60 | 60 |
| Temperatures | Compartment 7b | | 55 | 60 | 60 | 60 | 60 | 60 | 60 |
| (in °C.) | Compartment 7c | | 55 | 60 | 60 | 65 | 55 | 60 | 70 |
| | Compartment 7d | | 70 | 70 | 70 | 70 | 70 | 70 | 70 |
| | Drum 5 | | 70 | 70 | 70 | 70 | 70 | 70 | 70 |
| | Oven 13 | | 125 | 125 | 125 | 125 | 125 | 125 | 125 |
| Line speed (m/min) | | | 1.65 | 1.63 | 1 | 1.63 | 1.96 | 1.96 | 1.63 |
| Duration (min) | | | 6 | 6 | 10 | 6 | 5 | 5 | 6 |
| Outputs | Premixture | | 1.260 | 1.100 | 0.600 | 1.100 | 1.080 | 1.910 | 2.850 |
| (Kg/mi) | HCl catalyst at 32% | | 0.155 | 0.130 | 0.100 | 0.130 | 0.125 | 0.115 | 0.280 |
| Drying period of panels at 115/120° C. (h) | | | 6 | 6 | 6 | 4.5 | 4 | 3.5 | 12 |

EXAMPLE 9

A continuous phenol foam composite is produced with a thickness of about 50 mm, a width of about 500 mm, an apparent density of about 40 kg/m³, on whose upper face a Velimat 121 glass mat is applied as in the preceding examples, while to the lower face comprises a UNIFILO glass mat of about 450 g/m², about 6 mm thick.

The premixture which is taken into casting head 14 14 has the following composition:

100 parts of a formophenolic resin exhibiting a molar ratio F/P=1.5, 6.5% of free phenol, 70.5% dry extract, a viscosity of 1500 centipoises at 20° C., 1.2 parts of DC 193 silicone oil, 6.5 parts of technical pentane.

The premixture is introduced at a rate of 2.1 kg per minute and the catalyst, a solution of a sulfuric and phenolsulfonic acid at 80% by weight, introduced at a rate of 0.26 kg per minute, are mixed in casting head 14.

The mixture is poured on the glass mat carried by endless belt 1 at a speed of about 1.63 m/min which corresponds to a duration of about 6 minutes.

The production line temperatures are the following:
drum 3: 45° C.
compartment 7a: 43° C.
compartment 7b: 47° C.
compartment 7c: 60° C.
compartment 7d: 51° C.
oven: 91° C.

Expansion of the foam and application of the upper facing are performed as above except the facing is slightly or not at all impregnated with the resin by impression of the mat thereinto before calibration and the composite undergoing formation exhibits a thickness $e_0$ before the passage for calibration, slightly greater, by about 3 millimeters, than the calibration distance $e_1$ and when the composite goes into the passage, its upper face undergoes a pressing by upper belt 2, which causes an impregnation of the soft surface layer of the sheet by the thick upper facing.

At the output of the device the continuous, hardened composite is cut into panels which exhibit a good surface condition and are free of rupture line.

EXAMPLE 10 TO 15

Table 2 gives examples of production of panels with a phenol foam base by using solutions of mixtures of sulfuric acid and phenolsulfonic acid as catalysts. These panels are covered on the two faces with facings selected from: "Velimat" glass mats, corrugated cardboards with one face of kraft paper, complexes of the aluminum-kraft paper type, bituminous glass mats.

EXAMPLE 13B

The operation is under the same conditions as in Example 13, except the calibration distance is reduced to 45 mm. Under these conditions, the composite undergoing expansion reaches the passage for calibration with a thickness greater than the calibration distance by about 3 millimeters. However, the upper facing is not impressed into the foam facing. Consequently, at the passage for calibration the composite undergoes a reduction in thickness by compression.

As in Example 1B, the panels finally obtained are unsatisfactory and exhibit a rupture line.

Figure 8A:
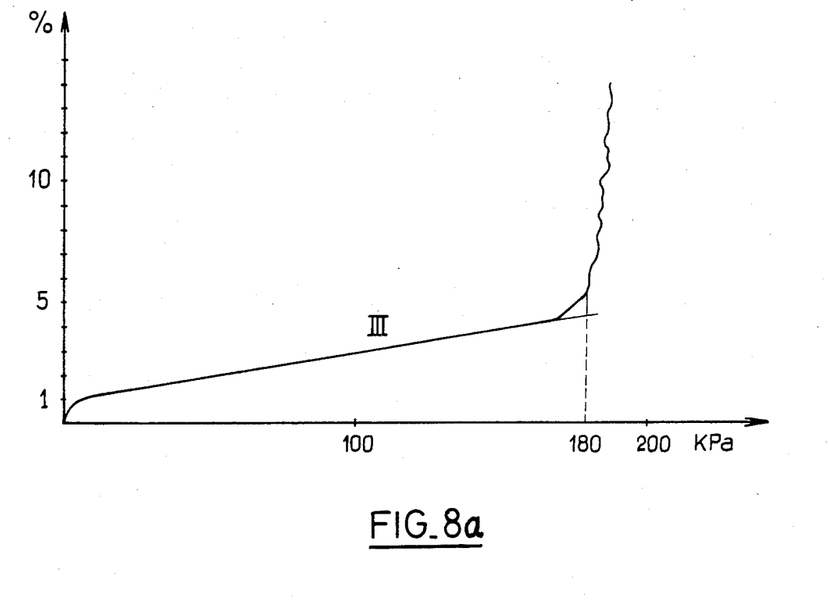
Figure 8B:
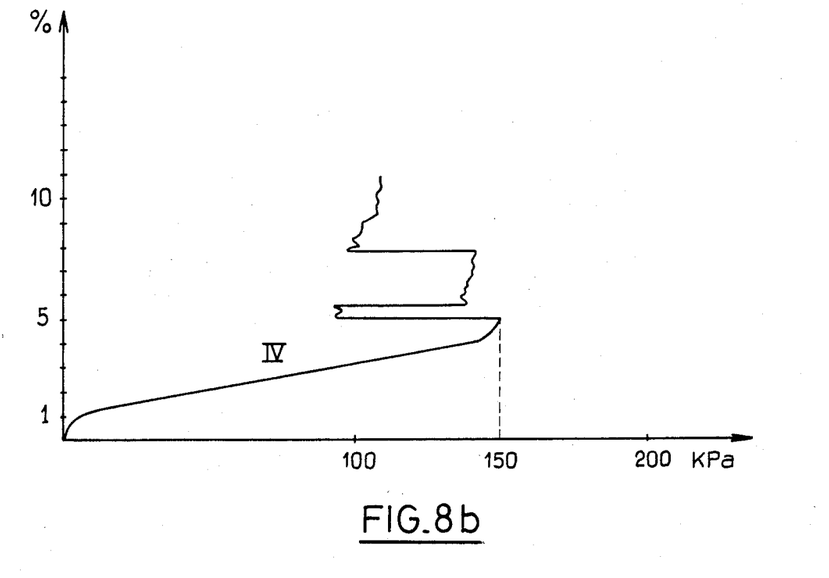

FIGS. 8 and 8B show the resistance to compression of the panels produced according to Example 13 (curve III) and 13B (curve IV). Again, the panels obtained according to Example 13, free of rupture line, exhibit a resistance to compression of about 180 KPa, while the panels obtained according to comparative Example 13B exhibit a resistance to compression of about 150 KPa, despite a greater density for these latter.

This invention has been disclosed with reference to particular and preferred examples. In particular, specific resins, parameters and dimensions have been provided, which are not intended to limit the invention. Variations will occur to those of ordinary skill in the art without the exercise of inventive faculty, and remain within the scope of the invention as claimed below.

What is claimed as new and desired to be secured by Letters Patent of the United States is:

1. A process for the continuous production of foam panels, comprising:
    casting a mixture of a heat expandable resin onto a lower facing, which lower facing is advanced on a conveyor,
    heating said cast mixture during said advance by application of heat from the side of said lower facing opposite said cast mixture, causing expansion of said cast mixture and hardening of that portion proximal to said lower facing,
    applying an upper facing to said cast mixture opposite said lower facing during said advance, thereby forming a composite,
    advancing said composite prior to complete expansion thereof into a heated enclosure while the portion of expanded cast mixture distant from said lower facing is not hardened, limiting said expansion by provision of a second conveyor in said heated enclosure parallel to and opposite said first conveyor,
    thereby limiting and calibrating the thickness of said formed composite which is subsequently completely hardened, and
    cutting said composite into panels.

2. The process of claim 1, wherein the thickness of said formed composite when it enters said heated enclosure is slightly less than the maximum potential thick-

TABLE 2

| | | | Examples n° | | | | | |
|---|---|---|---|---|---|---|---|---|
| | | | 10 | 11 | 12 | 13 | 14 | 15 |
| Apparent density (kg/m³) | | | 16 | 20 | 25 | 30 | 30 | 45 |
| Thickness (mm) | | | 50 | 50 | 25 | 50 | 25 | 50 |
| Premixture (parts by weight) | A-stage resin in aqueous solution | | 100 | 100 | 100 | 100 | 100 | 100 |
| | DC 193 silicone oil | | 2.7 | 1.8 | 1.7 | 1.125 | 1.35 | 1 |
| | Technical pentane | | 16 | 11 | 10 | 5.5 | 8 | 3 |
| Nature of facing | | | Velimat "121" | Corrugated cardboard 1 face Kraft 360 g/m² | Velimat "121" | Kraft alu | bituminous glass mat | Corrugated cardboard 1 face kraft 360 g/m² |
| Regulation of Temperatures (in °C.) | Drum 3 | expansion zone | amb. | 55 | 55 | 55 | 55 | 60 |
| | Compartment 7a | | amb. | 60 | 50 | 55 | 50 | 65 |
| | Compartment 7b | | 60 | 65 | 60 | 60 | 60 | 65 |
| | Compartment 7c | | 60 | 65 | 60 | 60 | 60 | 65 |
| | Compartment 7d | | — | 70 | 65 | 60 | 65 | 70 |
| | Drum 5 | | 70 | 70 | 70 | 70 | 70 | 70 |
| | Oven 13 | | 125 | 125 | 125 | 125 | 125 | 125 |
| Line speed (m/min) | | | 1.22 | 1.63 | 1.63 | 1.63 | 1.63 | 1.63 |
| Duration (min) | | | 8 | 6 | 6 | 6 | 6 | 6 |
| Outputs (Kg/mi) | Premixture | | 0.69 | 1.20 | 0.715 | 1.77 | 0.778 | 2.636 |
| | Sulfuric catalyst | | 0.10 | 0.135 | 0.095 | 0.19 | 0.102 | 0.274 | ness of said composite if said expansion were not limited.

3. The process of claim 2, wherein said maximum potential thickness is 1–5 millimeters greater than the thickness of said composite when introduced to said heated enclosure.

4. The process of claim 3, wherein said maximum potential thickness is 2–3 millimeters greater than the thickness of said formed composite when introduced to said heated enclosure.

5. The process of claim 1, wherein said upper facing comprises a layer of dimensionally stable material which is permeable to said expanded cast mixture prior to hardening.

6. The process of claim 5, wherein said formed composite has a thickness greater than the distance between said lower and upper conveyors, but the difference between said thickness and said distance is less than the thickness of said upper facing which is comprised of a woven or unwoven mat made from mineral fibers.

7. The process of claim 5, wherein said upper facing comprises a mat of continuous glass fibers having a surface density in excess of 250 g/m$^2$.

8. The process of claim 1, wherein said cast mixture comprises an A-stage resin.

9. The process of claim 1, wherein said lower facing is heated to a temperature sufficient to cause the immediate gelling of the mixture cast thereon.

10. The process of claim 7, wherein said cast mixture further comprises a catalyst selected from the group consisting of sulfuric acid, phenolsulfonic acid and mixtures thereof.

11. The panel produced according to the process of claim 1.

* * * * *